US012639582B2

(12) United States Patent
Chole et al.

(10) Patent No.: US 12,639,582 B2
(45) Date of Patent: May 26, 2026

(54) METHOD AND APPARATUS FOR USING A PACKET ARCHITECTURE TO PROCESS NEURAL NETWORKS IN A NEURAL PROCESSING UNIT

(71) Applicant: Expedera, Inc., Santa Clara, CA (US)

(72) Inventors: Sharad Vasantrao Chole, San Jose, CA (US); Shang-Tse Chuang, Los Altos, CA (US); Siyad Chih-Hua Ma, Palo Alto, CA (US)

(73) Assignee: Expedera, Inc., Santa Clara, CA (US)

( * ) Notice: Subject to any disclaimer, the term of this patent is extended or adjusted under 35 U.S.C. 154(b) by 415 days.

(21) Appl. No.: 17/970,450

(22) Filed: Oct. 20, 2022

(65) Prior Publication Data

US 2024/0152761 A1    May 9, 2024

Related U.S. Application Data

(60) Provisional application No. 63/270,558, filed on Oct. 21, 2021.

(51) Int. Cl.
   *G06N 3/08*        (2023.01)
   *G06F 8/41*        (2018.01)
        (Continued)

(52) U.S. Cl.
   CPC ............. *G06N 3/091* (2023.01); *G06F 8/433* (2013.01); *G06F 8/451* (2013.01); *G06F 8/453* (2013.01);
        (Continued)

(58) Field of Classification Search
   CPC .......... G06F 8/433; G06F 8/451; G06F 8/453; G06F 9/545; G06F 9/3863; G06F 9/3838;
        (Continued)

(56) References Cited

U.S. PATENT DOCUMENTS 11,467,811 B1 *  10/2022  Durakovic .............. G06F 8/425
2018/0285715 A1 *  10/2018  Son ........................ G06N 3/045
        (Continued)

OTHER PUBLICATIONS

Kornilios Kourtis et al., Compiling Neural Networks for a Computational Memory Accelerator, Apr. 24, 2020, [Retrieved on Jan. 3, 2026]. Retrieved from the internet: <URL: https://arxiv.org/pdf/2003.04293> 8 Pages (1-8) (Year: 2020).*

*Primary Examiner* — Anibal Riveracruz
(74) *Attorney, Agent, or Firm* — Carr & Ferrell LLP

(57)        ABSTRACT

Artificial intelligence is an increasingly important sector of the computer industry. However, artificial intelligence is an extremely computationally intensive field such that it can be expensive, time consuming, and energy consuming field. Fortunately, many of the calculations required for artificial intelligence can be performed in parallel such that specialized processors can greatly increase computational performance for AI applications. Specifically, artificial intelligence generally requires large numbers of matrix operations such that specialized matrix processor circuits can greatly improve performance. To efficiently execute all these matrix operations, the matrix processor circuits must be quickly and efficiently supplied with a stream of data and instructions to process or else the matrix processor circuits end up idle. Thus, this document discloses packet architecture for efficiently creating and supplying neural network processors with work packets to process.

20 Claims, 21 Drawing Sheets

(51) Int. Cl.

| | |
|---|---|
| *G06F 8/71* | (2018.01) |
| *G06F 9/30* | (2018.01) |
| *G06F 9/38* | (2018.01) |
| *G06N 3/04* | (2023.01) |
| *G06N 3/063* | (2023.01) |
| *G06N 3/091* | (2023.01) |
| *G06F 9/345* | (2018.01) |
| *G06F 9/54* | (2006.01) |

(52) U.S. Cl.
CPC ......... *G06N 3/063* (2013.01); *G06F 9/30036* (2013.01); *G06F 9/30058* (2013.01); *G06F 9/3455* (2013.01); *G06F 9/3838* (2013.01); *G06F 9/3842* (2013.01); *G06F 9/3863* (2013.01); *G06F 9/3877* (2013.01); *G06F 9/545* (2013.01); *G06N 3/04* (2013.01); *G06N 3/08* (2013.01)

(58) Field of Classification Search
CPC .............. G06F 9/3842; G06F 9/30058; G06F 9/30036; G06F 9/3855; G06F 9/3455; G06F 9/3877; G06F 9/2027; G06N 3/091; G06N 3/063; G06N 3/08; G06N 3/04
See application file for complete search history.

(56) References Cited

U.S. PATENT DOCUMENTS

| | | | |
|---|---|---|---|
| 2019/0205736 A1* | 7/2019 | Bleiweiss | G06N 20/00 |
| 2020/0117400 A1* | 4/2020 | Golov | G06N 3/06 |
| 2020/0160226 A1* | 5/2020 | Ross | G06N 3/08 |
| 2021/0035258 A1* | 2/2021 | Ray | G06F 9/30036 |
| 2022/0147797 A1* | 5/2022 | Mclelland | G06N 3/063 |
| 2022/0342666 A1* | 10/2022 | Ju | G06N 3/084 |
| 2022/0343137 A1* | 10/2022 | Surendran | G06N 3/063 |
| 2022/0374723 A1* | 11/2022 | Blukis | G06F 18/217 |
| 2022/0383082 A1* | 12/2022 | Zhang | G06N 3/045 |
| 2022/0391678 A1* | 12/2022 | Zhang | G06N 3/04 |
| 2022/0414455 A1* | 12/2022 | Collins | G06N 3/08 |
| 2023/0121044 A1* | 4/2023 | Grover | G06F 8/30 |
| | | | 706/25 |

* cited by examiner

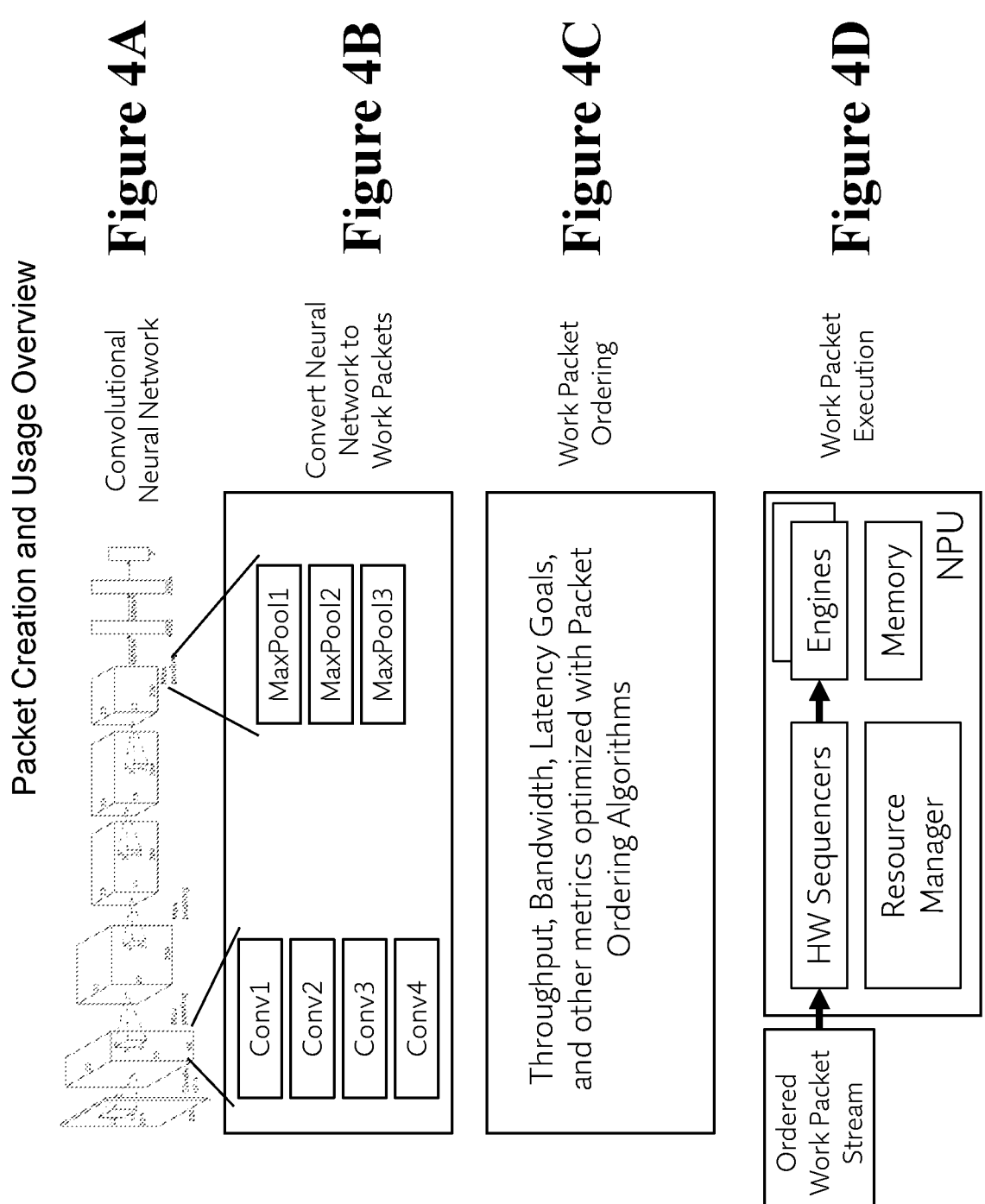

Packet Creation and Usage Overview

Figure 4A

Convolutional Neural Network

Figure 4B

Convert Neural Network to Work Packets

Conv1
Conv2
Conv3
Conv4

MaxPool1
MaxPool2
MaxPool3

Figure 4C

Work Packet Ordering

Throughput, Bandwidth, Latency Goals, and other metrics optimized with Packet Ordering Algorithms

Figure 4D

Work Packet Execution

Ordered Work Packet Stream

HW Sequencers

Engines

Resource Manager

Memory

NPU

580

550

560

570

1x1 Convolution

540

510

520

530

3x3 Convolution

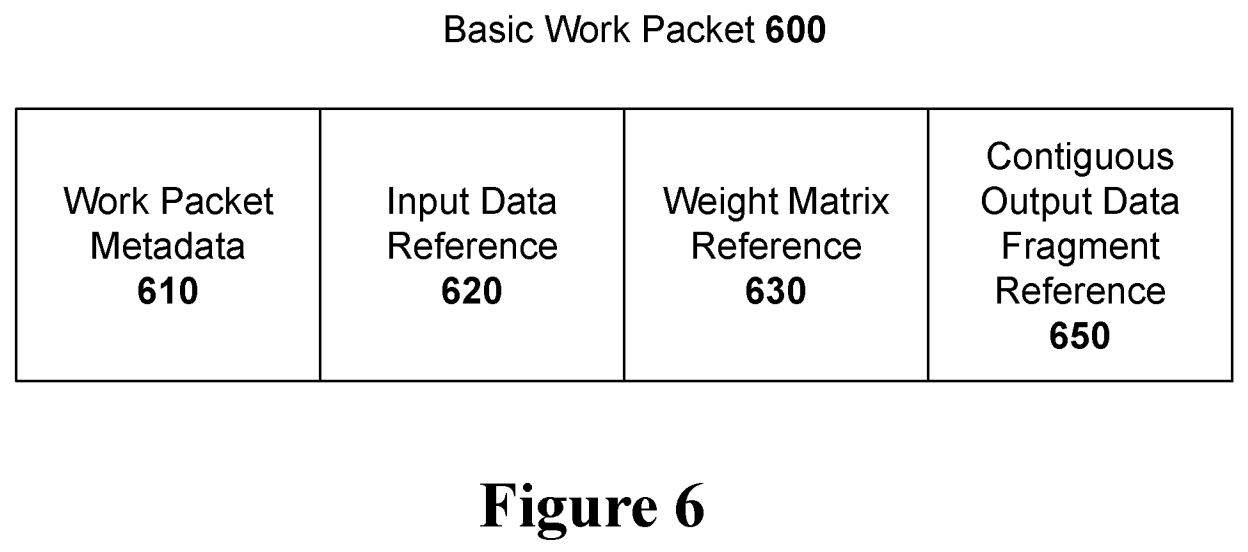

Basic Work Packet 600

| Work Packet Metadata 610 | Input Data Reference 620 | Weight Matrix Reference 630 | Contiguous Output Data Fragment Reference 650 |
|---|---|---|---|

Figure 6

Neural Network Layer Work Packet Metadata 700

| Neural Network Layer Type | Operands & Shapes | Neural Network Layer Attributes |
|---|---|---|
| Conv2D | Input [Batch, Height, Width, Input Channels] Weight [Output Channels, Kernel Height, Kernel Width, Input Channels] Bias | Padding, Stride, Groups, Dilation, Depth Multiplier, Quantization Info |
| MaxPool2D | Input [Batch, Height, Width, Channels] | Padding, Stride, Kernel Size |
| Add | Input_1 [N dimension tensor] Input_2 [N dimension tensor] ..... Input_m [N dimension tensor] | Quantization Info |
| Resize2D | Input [Batch, Height, Width, Channels] | Resize Factor, Interpolation method, Alignment |
| RNN Cell | Input[Batch, Input_Dim] Hidden State[Batch, Hidden Dim] Weights | Activation Types, Gate Types |

Figure 7

Full Packet Description 1000

| Identifier | Layer Metadata | Resource Management | Synchronization | Scheduling Info | Debug Stats | Encapsulation & Control |
|---|---|---|---|---|---|---|
| Type & Identifier for which Layer/Operation this packet belong to | Layer specific information including Type, Operands, Outputs, Shapes, Attributes, etc. | HW Resource pointers, allocation & deallocation info Buffering/Enqueue/Free Semantic | Generate Notification for an event or wait for event | Priority for the packets, including polity & metadata as well as engine destination | Information about execution statistics, errors and interrupts, status of engines | Group of multiple packets – Can be used as control structure – Loops/Conditional execution |

Figure 10

Resource Management Packet Metadata 1100

| Command | Operands | Resource Types | Objective |
|---|---|---|---|
| Reserve | Current JobID<br>Range of resources in terms of counts or min/max pointers or List | Shared Buffers,<br>Global Memory,<br>Synchronization Flags<br>Bandwidth | Reserve shared resources so they cannot be allocated by any other job in the system |
| Release | Current JobID<br>Pointer & Lengths or List | | |
| Allocate | Allocation ID<br>Size of the allocation<br>Granularity of allocation | On Chip memory<br>External Memory | Dynamically allocate resources when needed during execution |
| Deallocate | Pointer to resources or List or Allocation ID & Length | | |

Figure 11

Synchronization Packet Metadata 1200

| Type | Operand | Description | Objective |
|---|---|---|---|
| Clear | Event ID | Clear counter | Reset state of the event count |
| Increment Count | Event ID Destination increment value | Increment Counter by given increment value | Update the event counter, so execution waiting of smaller values can be unblocked |
| Wait | Event ID wait value | Stall till the counter value becomes equal to or greater than wait value | Wait till certain event happens for execution |

Figure 12

Data Transfer Packet Metadata 1300

| Type | Source | Destination | Operands | Credits |
|------|--------|-------------|----------|---------|
| Transfer | Source Resource Type and Resource Pointer | Destination Resource Type and Resource Pointer | Size, granularity, broadcast information, Data Transformation | Credits added/deducted by transfer per granularity |

Figure 13

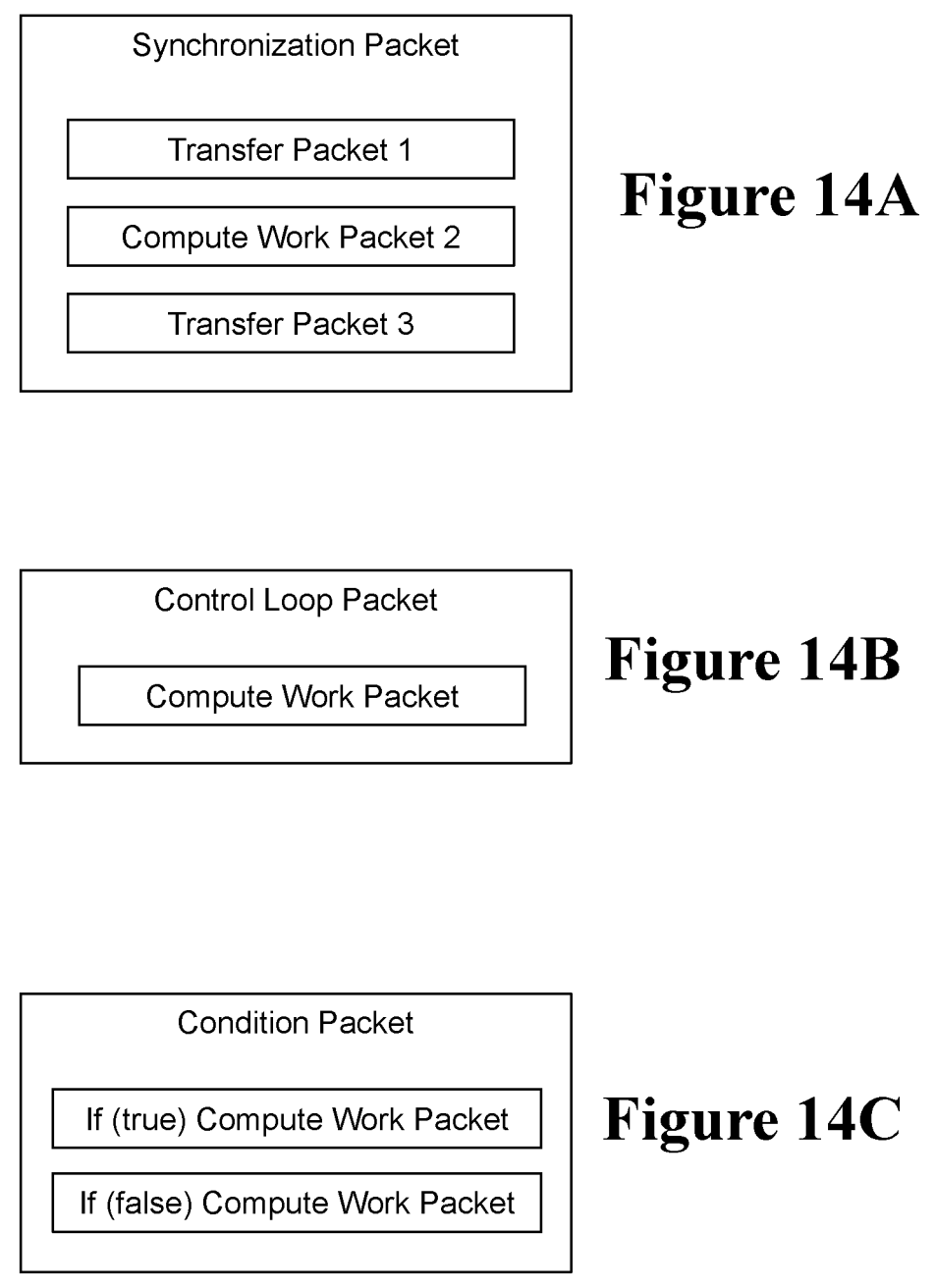

Synchronization Packet

Transfer Packet 1

Compute Work Packet 2

Transfer Packet 3

Figure 14A

Control Loop Packet

Compute Work Packet

Figure 14B

Condition Packet

If (true) Compute Work Packet

If (false) Compute Work Packet

Figure 14C

METHOD AND APPARATUS FOR USING A PACKET ARCHITECTURE TO PROCESS NEURAL NETWORKS IN A NEURAL PROCESSING UNIT

RELATED CASES

The present application claims the benefit under 35 U.S.C. § 119(e) of the United States provisional patent application filed on Oct. 21, 2021, having Ser. No. 63/270, 558 titled "A Packet Architecture for AI Processing".

TECHNICAL FIELD

The present invention relates to the field of neural network processing. In particular, but not by way of limitation, the present invention discloses a system for dividing neural network processing tasks into individual work packets that may then be processed in parallel.

BACKGROUND

Computer system designers are always attempting to design faster and faster computer systems. Faster computer systems allow for more complex computational tasks to be performed such as weather prediction, protein-folding, natural language processing, digital image analysis, and complex three-dimensional video renderings. Furthermore, the computational models being simulated can be made ever more detailed thus rendering more accurate results.

One of the computation fields that is most in need of faster processing is the field of Artificial Intelligence (AI). Artificial Intelligence is increasingly being used for a wide variety of very complex tasks such as digital image recognition, natural language processing, High-Performance Computing (HPC), data mining, video game character control, medical diagnostics, automated customer response systems, and self-driving vehicles. Even small portable computer systems such as smartphones now contain dedicated artificial intelligence processing systems to improve digital photography and speech recognition.

Artificial Intelligence applications tend to rely very heavily on matrix operations from the mathematical field of linear algebra. Specifically, matrix computation operations are required to implement artificial neural networks. The artificial neural networks learn from a set of training data to create a set of matrix weights that embody pattern recognition information. The artificial neural networks then later apply that embodied learning to new input data in order to draw inferences about the new input data.

Due to the very heavy usage of matrix computations, artificial intelligence is a very computationally intensive field of computing that is greatly in need of computational optimizations. One of the most popular techniques to improve artificial intelligence application performance is to create specialized digital processing circuits that are optimized for performing the matrix operations needed to implement an artificial neural network. The specialized matrix operation processors may take advantage of the parallelism inherent in matrix operations and thus much more efficiently execute the matrix operation computations than a conventional computer processor can.

Artificial Intelligence applications are generally developed in very high-level programming languages that abstract away the low-level matrix computations from the artificial intelligence application developers. In this manner, the application developers can concentrate on the application being developed instead of low-level computation instructions. However, the high-level programming code from an artificial intelligence application developer must ultimately be compiled into low-level computer instructions that can be executed by conventional computer processors and specialized matrix operation processors. In order to execute the artificial intelligence application quickly, the compiler and code execution system must create efficient low-level code and execute that code using the computational resources efficiently. Therefore, it is desirable to develop advanced techniques for processing high-level artificial intelligence code into lower-level primitives that will execute efficiently on specialized matrix operation processors.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings generally illustrate, by way of example, but not by way of limitation, various embodiments discussed in the present document.

FIG. 4A illustrates a conceptual diagram of a multi-layer convolutional neural network.

FIG. 4B illustrates work packets created for the multi-layer convolutional neural network of FIG. 4A.

FIG. 4C illustrates a work packet ordering phrase for the work packets illustrated in FIG. 4B.

FIG. 4D illustrates a neural processing unit processing the ordered work packet stream created in FIG. 4B.

FIG. 6 conceptually illustrates the contents of a basic neural network work packet.

FIG. 7 illustrates examples of metadata that may be stored in the basic neural network work packet.

FIG. 10 conceptually illustrates the contents of a full neural network packet.

FIG. 11 illustrates example metadata for a resource management control packet.

FIG. 12 illustrates example metadata for a synchronization control packet.

FIG. 13 illustrates example metadata for a data transfer control packet.

FIG. 14A conceptually illustrates the contents of a synchronization packet encapsulating a first data transfer packet, a work packet, and a second data transfer packet.

FIG. 14B conceptually illustrates a control loop packet that encapsulates a work packet.

FIG. 14C conceptually illustrates a condition packet that encapsulates two different work packets that may be executed.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments may not be required in order to practice the present invention. For example, although some of the example embodiments are disclosed with reference to a specific matrix processor circuit implementation, the disclosed techniques may be used with any other implementations of a matrix processor circuit. The example embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Neural Networks Overview

One of the core techniques in artificial intelligence (AI) is the use of artificial neural networks (ANNs). Artificial neural networks first learn from sets of training data and then are later used to make logical inferences from new input data.

Artificial neural networks were originally designed to be similar to the biological neuron networks within animal brains.

Figure 1A:
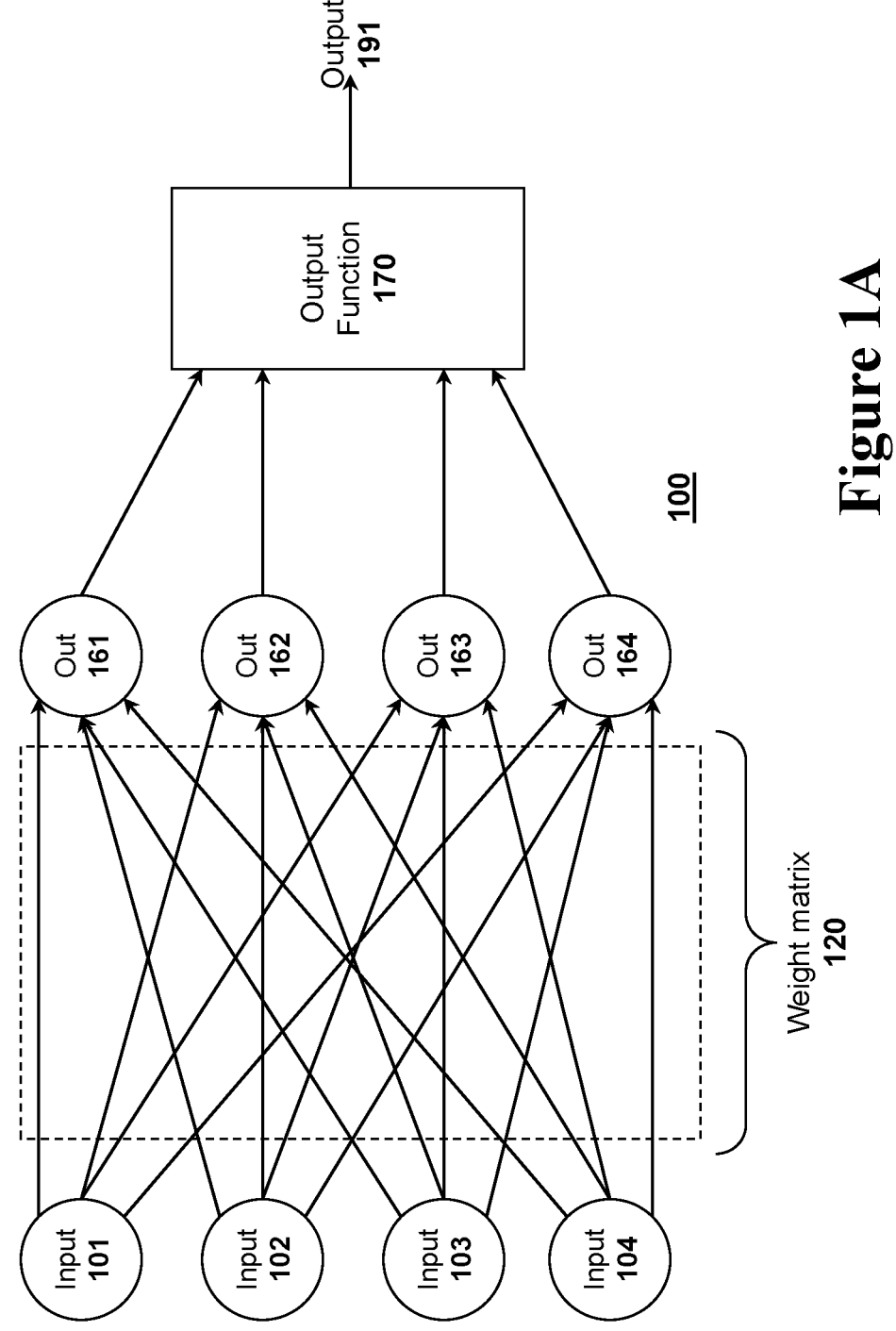
FIG. 1A illustrates a conceptual diagram of a single-layer artificial neural network.

FIG. 1A illustrates a conceptual diagram of a very simple single-layer four-input artificial neural network 100. Referring to FIG. 1A, an input data vector (made up of input data 101 to 104) is provided with training data during training sessions and then with new input data when the artificial neural network is used to make inferences. The input data vector (made up of input data 101 to 104) is processed with weight data stored in a weight matrix 120 to create an output data vector (made up of output data 161 to 164). Many different types of data processing may be performed using weight matrix 120 (such as a Hadamard product, Fronius inner product, matrix addition, etc.) However, this document will focus on the well-known matrix product.

After processing the input data vector with the weight matrix 120 the neural network system creates the output data vector (made up of output data 161 to 164). The output data vector may be combined with an output function 170 to create a final output 191 for the artificial neural network 100. The output function 170 may be referred to as an activation function. During training sessions, the output data may be compared with a desired target output (not shown) and the difference between the output data and the desired target output may be used to adjust the weight data within weight matrix 120 to improve the accuracy of the artificial neural network 100.

Note that the four-input artificial neural network of FIG. 1A illustrates just one example of a simple small artificial neural network 100. Artificial neural networks may be constructed much wider than just four inputs. Multiple independent artificial neural networks may be used in parallel, and the outputs of the parallel independent artificial neural networks may be combined.

Figure 1B:
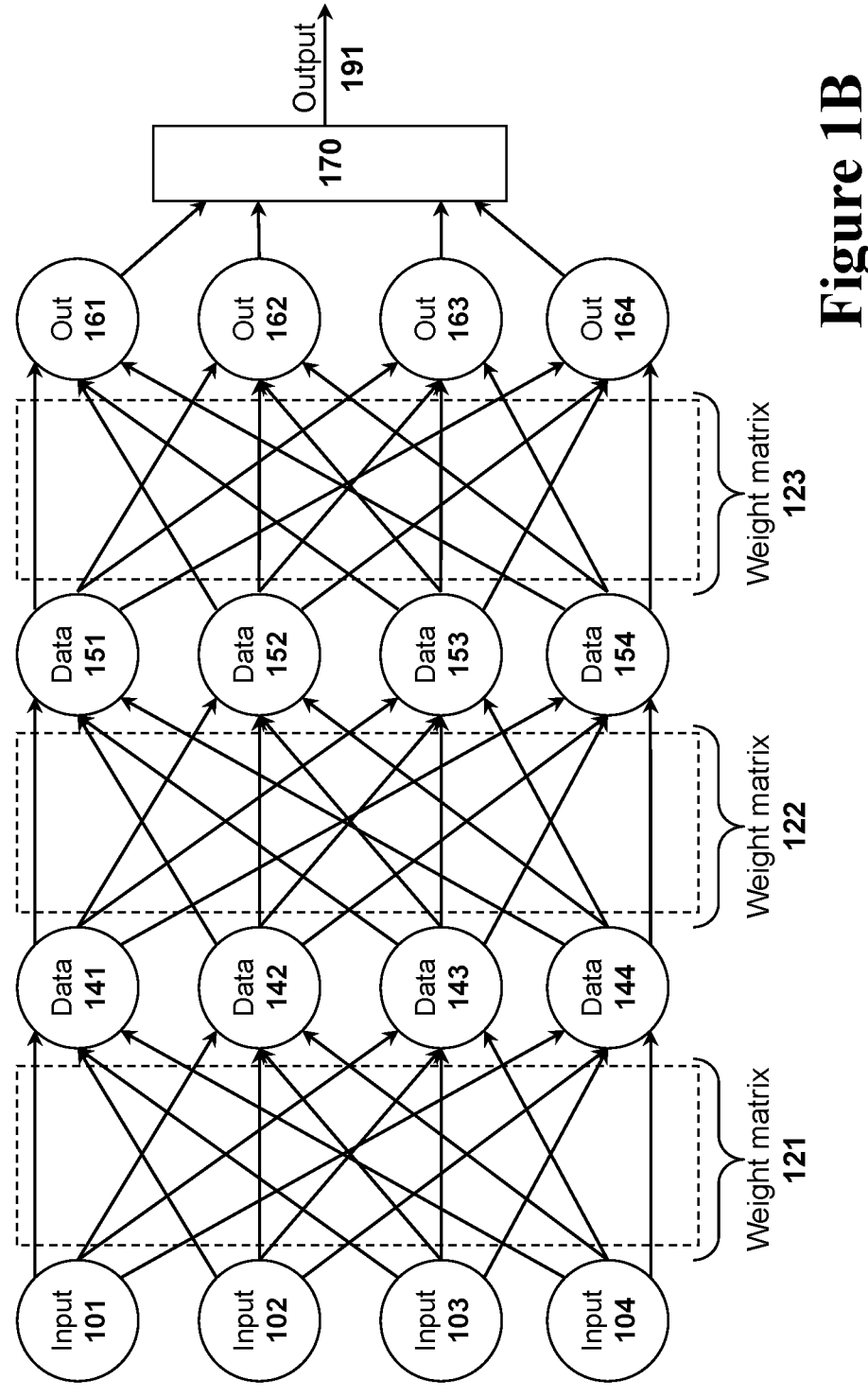
FIG. 1B illustrates a conceptual diagram of a three-layer artificial neural network.

Artificial neural networks may comprise many layers of weight matrices such that very complex computational analysis of the input data may be performed. For example, FIG. 1B illustrates a three-layer artificial neural network wherein the input data vector (made up of input data 101 to 104) is processed with a first weight matrix 121 to create a first intermediate data vector (made up of data 141 to 144). Next, the first intermediate data vector (made up of data 141 to 144) is processed with a second weight matrix 122 to create a second intermediate data vector (made up of data 151 to 154). Then second intermediate data vector (made up of data 151 to 154) is processed with a third weight matrix 123 to create the final output data vector (made up of output data 161 to 164). Output data vector (made up of output data 161 to 164) may then be processed by output function 170 to create a final output 191. Alternatively (or in addition to), the output data vector (made up of output data 161 to 164) may also be used as intermediate data that is fed into additional artificial neural network layers (not shown) such that very complex hierarchical artificial neural networks may be created.

Figure 1C:
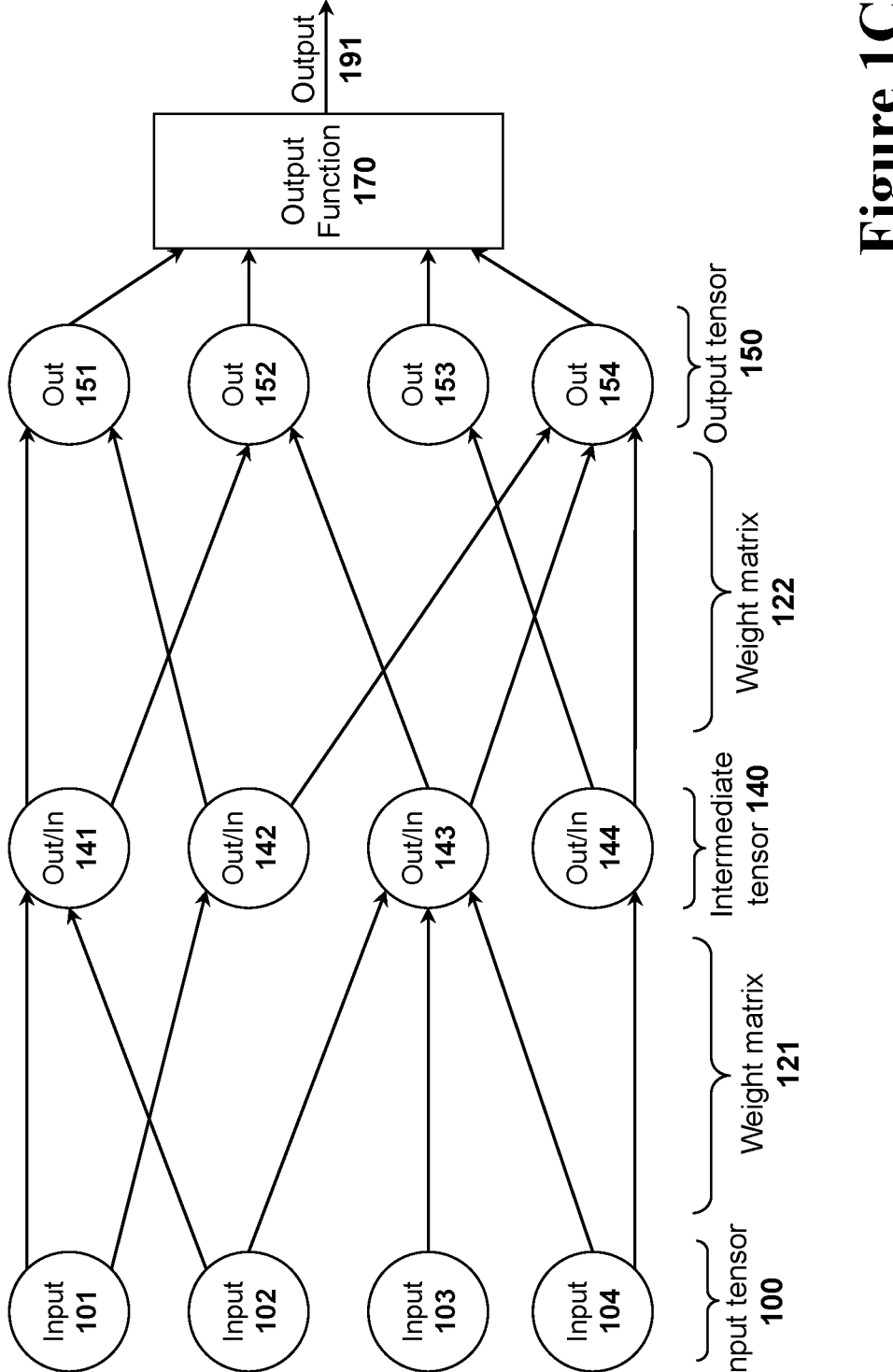
FIG. 1C illustrates a conceptual diagram of a sparse two-layer artificial neural network.

Note that not all input data and intermediate data affect all subsequent intermediate and output data. For example, FIG. 1C illustrates an example neural network with fewer data dependencies between the neural network layers. For example, as illustrated in FIG. 1C, only input data 101 and 102 affect intermediate data 141 instead of all the input data (101 to 104).

Abstracted Matrix Processor Circuit

As illustrated with reference to FIGS. 1A to 1C, artificial intelligence relies upon large amounts of very computationally intensive matrix operations to initially learn using training data to adjust the weights in the weight matrices. Later, those adjusted weight matrices are used to perform complex matrix computations with a set of new input data to draw inferences upon the new input data. Fortunately, the linear algebra matrix operations used in an artificial neural network allow for many performance optimizations to be made since there is a significant amount of parallelism in the matrix computational tasks that are required.

To provide optimal processing for artificial intelligence tasks, specialized matrix processors may be used. A matrix processor is a digital processing circuit that has been designed to help efficiently perform artificial intelligence computational tasks. Specifically, a matrix processor is designed to rapidly read input data vectors, output data vectors, and matrix weight data in a parallel format for high throughput. In this manner, the matrix processor circuit can be used for forward propagation inferences as well as for backpropagation artificial intelligence learning.

Matrix processor circuits can be implemented in many different sizes and in many different manners. However, to efficiently process large matrix operations, multiple matrix processor circuits may be combined together in efficient manners such that a controlled network of matrix processor circuits can perform a wide variety of matrix operations. Thus, to simplify this disclosure an abstracted matrix processor circuit will be disclosed with reference to FIG. 2A.

Figure 2A:
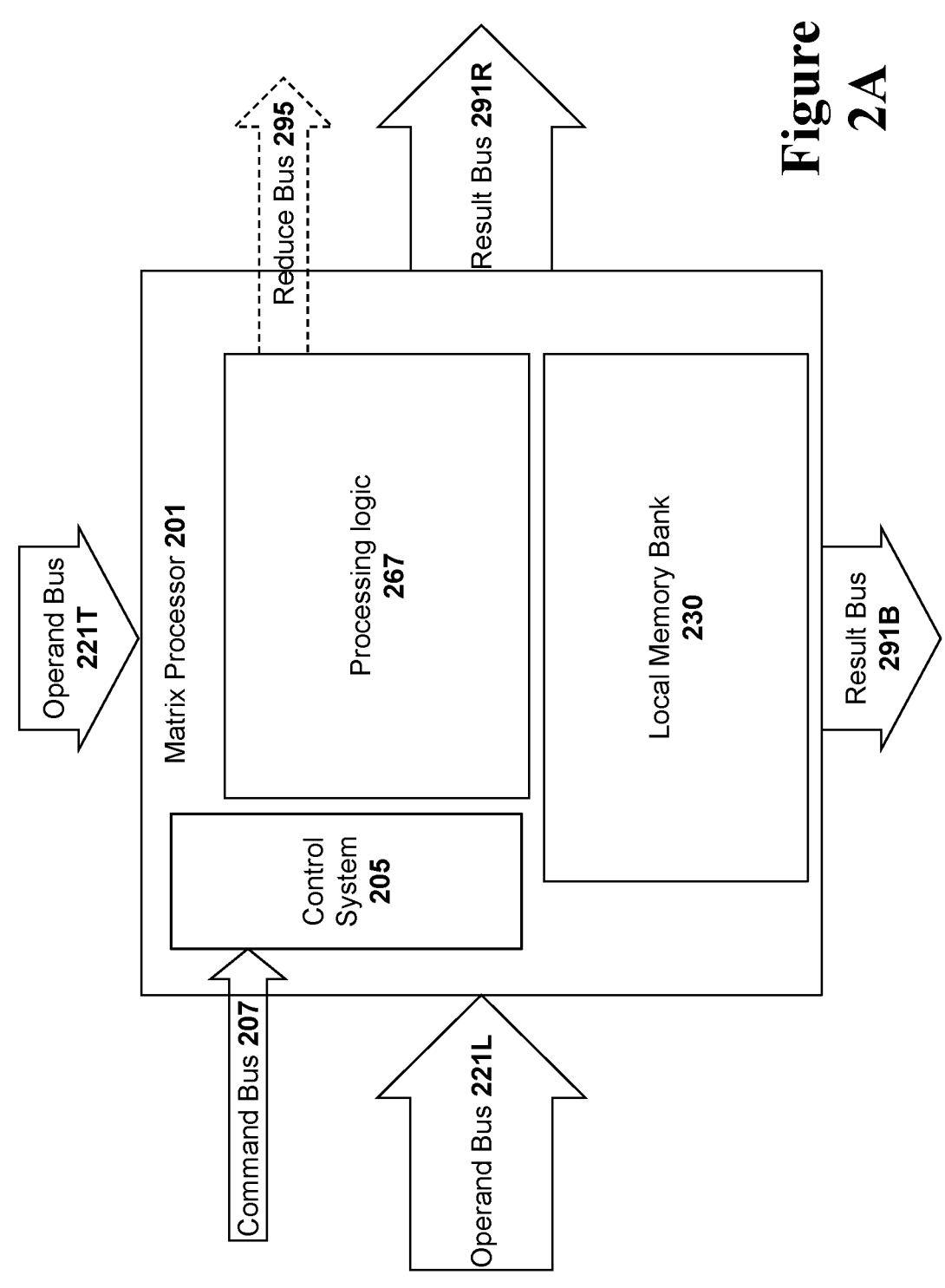
FIG. 2A illustrates a block diagram of an abstracted matrix processor circuit that may be used to perform matrix calculations.
Figure 2B:
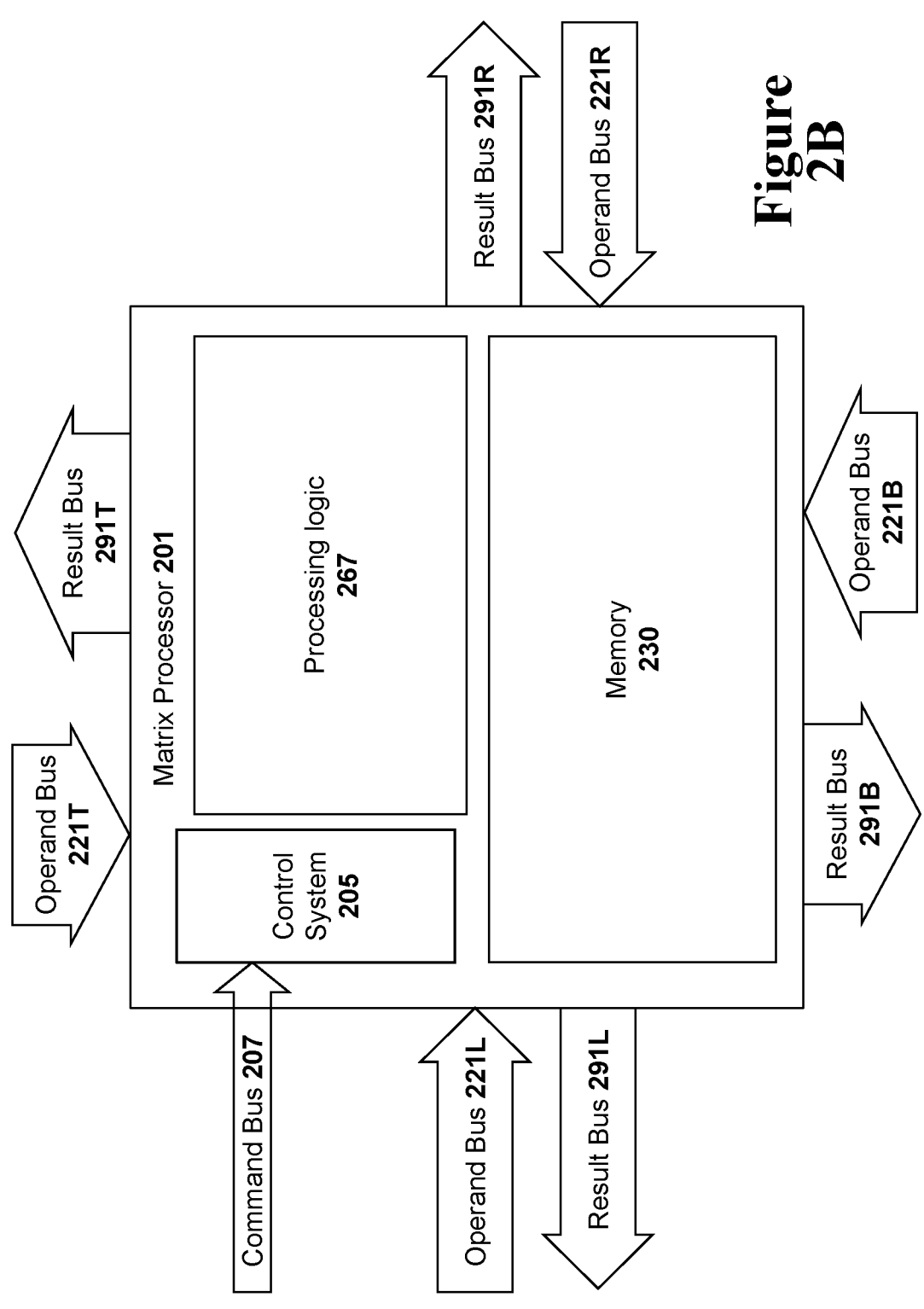
FIG. 2B illustrates a block diagram of an abstracted matrix processor circuit with bus interfaces on all sides.

FIG. 2A illustrates a first block diagram of an example abstracted matrix processor circuit 201. The abstracted matrix processor circuit 201 receives input data on one or more operand buses. In the particular embodiment of FIG. 2A, there are two operand buses: operand bus from the top 221T and operand bus 221L from the left. Data received on the operand buses may be used directly by the processing logic 267 or may be stored in local memory bank 230 for later usage. The data received may comprise weight matrix data, input data operand vectors, or other data. The local memory bank 230 may also include register files closely coupled to the processing logic 267. Note that operand and result buses may be placed on all of the different sides of the matrix process array circuit. FIG. 2B illustrates an example that has operand buses (221T, 221B, 221L, and 221R) and result buses (291T, 291B, 291L, and 291R) on all sides.

Referring back to FIG. 2A, the matrix processor circuit 201 also receives commands on command bus 207. The control system 205 within the matrix processor circuit 201 parses the commands received and uses the commands to determine how the processing logic 267 will be used to process data. The processing logic 267 may be implemented in many different manners as long as the matrix processor circuit 201 performs the desired matrix operations and outputs the proper matrix operation results. For example, the processing logic 267 may be implemented with a single-instruction multiple-data (SIMD) processor, a digital signal processor (DSP), a conventional central processing unit (CPU) core, or in any other manner that performs the desired matrix operations.

The abstracted matrix processor circuit 201 may be designed to operate using many different types of data formats and data precision levels. For example, the abstracted matrix processor circuit 201 may process integers, 16-bit floating point numbers, 32-bit floating point numbers, or any other data format. Many different matrix operations may be implemented in the abstracted matrix processor circuit 201. Two well-known matrix operations that may be included are the matrix dot product and the matrix cross products.

The control system 205 instructs the processing logic 267 to output the results of requested matrix operations on one or more result bus 291 (291T, 291B, 291L, and 291R). In some embodiments, the matrix processor circuit 201 will include the reduction logic to output a reduced form of the result on a reduce bus 295. As will be described later, reduction logic may also be implemented outside of the matrix processor circuit 201.

The operand buses 221T and 221L are wide parallel buses such that entire input data vectors may be loaded into the abstracted matrix processor circuit 201 in a single cycle or multiple cycles. Similarly, entire weight matrix rows from a weight matrix may be read into the local memory bank 230 of the abstracted matrix processor circuit 201 in a single cycle. Similarly, the result buses 291R and 291B are also wide parallel buses such that entire output data vectors can be output from the abstracted matrix processor circuit 201 in a single cycle. The local memory bank 230 is a very important component of the abstracted matrix processor circuit 201. As set forth earlier, the local memory bank 230 of the abstracted matrix processor circuit 201 is both wide and deep to optimize performance.

The local memory bank 230 is wide in that entire data vectors can be written into or read out of the local memory bank 230 in a single cycle. For example, in a large matrix processor circuit 201 that handles a 16 by 16 element matrix wherein each element is a 16-bit floating-point value, the local memory bank 230 can read out 256-bit values such that entire sixteen element data vectors of 16-bit data values each can be read out of the local memory bank 230 in a single cycle.

The local memory bank 230 is deep in that it is constructed large enough to store multiple different sets of weight matrices. In this manner, the matrix processor circuit 201 can be used to perform matrix operations for multiple different artificial neural network layers without having to reload different matrix weight values. For example, if a matrix processor circuit 201 cannot perform an operation for one particular neural network layer because a required input data vector is not yet available, that matrix processor circuit 201 can instead be used to perform matrix operations for other neural network layers or for other neural networks. A deep local memory bank 230 allows the matrix processor circuit 201 to be used very efficiently since it can handle a steady stream of requested matrix operations for many different neural networks without ever needing to load in new weight matrix data. Loading in weight matrix data can be one of the most time consuming (and energy consuming) tasks for a matrix processor circuit 201.

In addition to storing weight values for multiple different weight matrices, the local memory bank 230 can be used to store other information that may be needed such as input data vectors, output data vectors, error vectors, etc. Intermediate result data vectors from forward pass operations may be stored in the local memory bank 230 and then later accessed when performing a related back propagation operation. Another very important type of data that may be stored in the local memory bank 230 is matrix weight gradients. A matrix weight gradient comprises a matrix of adjustments for a weight matrix that may be periodically used to update the weight matrix.

Combining Matrix Processors to Create a Neural Processing Unit

The abstracted matrix processor circuits illustrated in FIGS. 2A and 2B can be used alone to perform simple matrix operations very quickly. For example, the matrix processor circuit 201 can be used to fully process the very small artificial neural network illustrated in FIG. 1A. It could also be used to implement the small three-layer artificial neural network illustrated in FIGS. 1B and 1C by using it serially to perform the required matrix calculations of all three artificial neural network layers coupled by weight matrices 121, 122, and 123.

However, most artificial neural networks must handle much larger data input vectors and output vectors than the very small example artificial neural networks illustrated in FIGS. 1A and 1B. It is therefore desirable to combine the computing capabilities of many different matrix processor circuits 201 in order to process wider artificial neural networks and multi-layer artificial neural networks. In this manner, much larger multi-layer artificial neural networks that are used to perform useful artificial intelligence tasks can be handled very efficiently.

Figure 3:
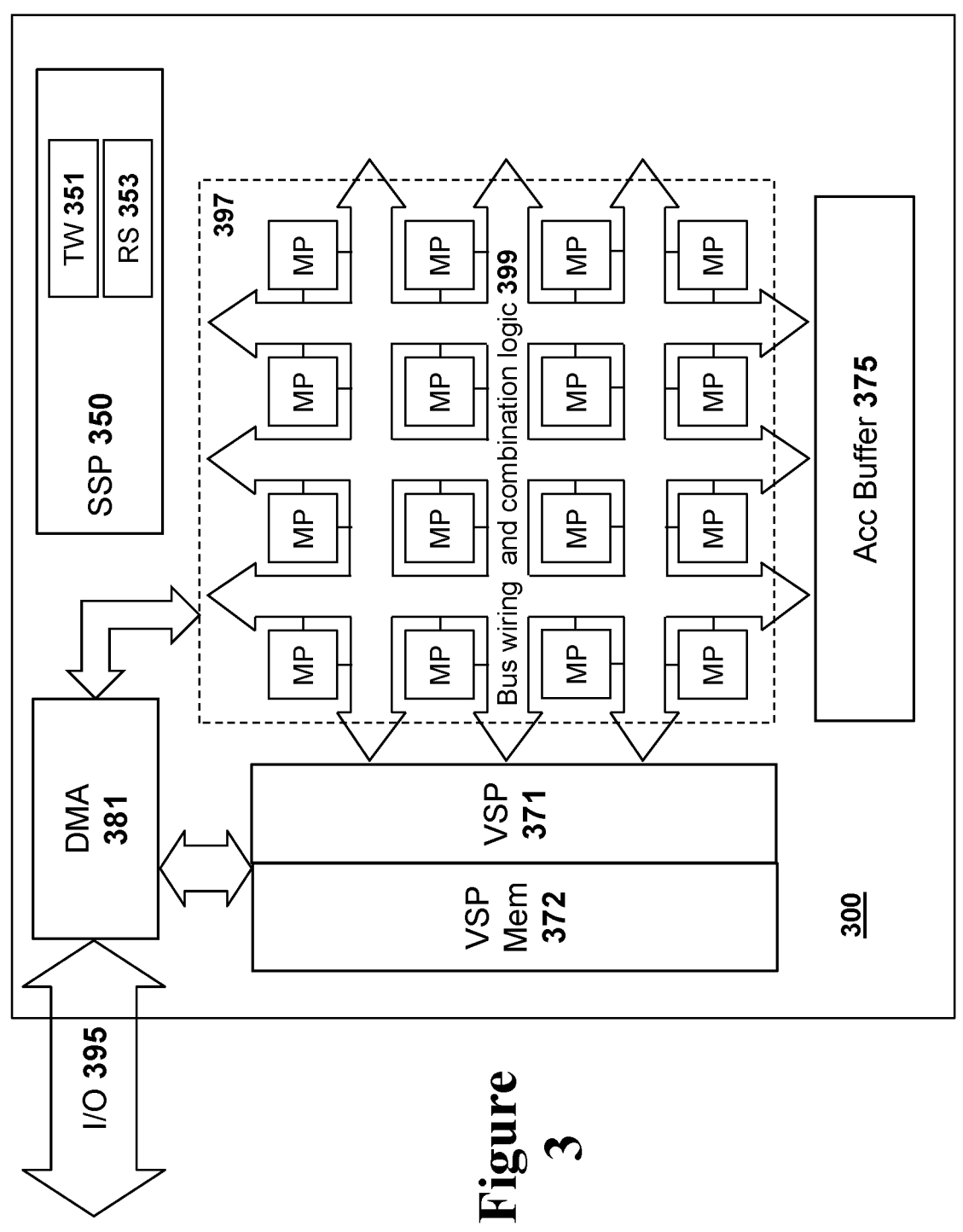
FIG. 3 illustrates a block diagram of an array of matrix processors used to create a Neural Processing Unit (NPU).

FIG. 3 illustrates a block diagram of a first embodiment of an architecture using multiple matrix processor circuits in a coordinated matter to efficiently process wide multi-layer artificial neural networks. In FIG. 3, each individual matrix processor circuit is labelled as "MP" for matrix processor. As illustrated in the example of FIG. 3, the matrix processor circuits are arranged in a grid array format. In between the individual matrix processor circuits of the matrix processor array is bus wiring and combination logic 399 that couples all the individual matrix processor circuits in the array to buffers that carry input data vectors, matrix weight values, and result data vectors. The array of matrix processors and the bus wiring and combination logic 399 may be referred to as a matrix processor array 397. The bus wiring and combination logic 399 may be implemented in different manners to achieve different goals.

To provide input data vectors to the matrix processor array 397 in one embodiment, a Vector Scalar Processor (VSP) 371 is coupled to an operand bus of every individual matrix processor circuit in the matrix processor array 397 with bus wiring and combination logic 399. The Vector Scalar Processor (VSP) 371 may include or be coupled to VSP memory 372 for storing data vectors, weight matrices, and other data needed for processing operations. This may be accomplished by coupling operand bus 221L, as illustrated in FIG. 2A. In this manner, data vectors can be loaded into the individual matrix processor circuits in the matrix processor array 397. The data vectors may comprise weight matrix rows, input data vectors, or any other required data for the processing operations to be performed. Note that since there are multiple buses, these data vector loading operations can be performed in parallel.

Similarly, the result bus of every individual matrix processor circuit in the array is coupled to an accumulation buffer (Act Buffer) 375 on the bottom of the matrix processor array 397 using bus wiring and combination logic 399. This may be accomplished by coupling result bus 291B of FIG. 2A to accumulation buffer 375 (Acc Buffer) on the bottom as illustrated in FIG. 3. The accumulation buffer 375 contains both storage for storing result data vectors and processing logic for performing various vector processing operations on received result data vectors. For example, the accumulation buffer 375 can combine partial result data vectors from multiple different matrix processor circuits into a single complete output data vector result.

All of the individual matrix processor circuits in the matrix processor array 397 receive commands on their individual command buses. In this manner, each individual matrix processor circuit in the array can be controlled individually. For example, the individual matrix processor circuits can be informed when data is available on their operand buses and what operations to perform. By carefully controlling each individual matrix processor circuit in the matrix processor array 397 in a coordinated manner, the matrix processor array 397 becomes a very powerful system for efficiently processing matrix operations needed for neural network applications. Specifically, the matrix processor array 397, along with all the supporting circuitry (Accumulation Buffer 375, Vector Scalar Processor 371, Direct Memory Access unit 381, etc.) may be referred to as a Neural Processing Unit (NPU) 300.

Neural Processing Unit Operation

Referring to FIG. 3, the Neural Processing Unit (NPU) 300 is controlled by a Scheduler & Sequence Processor (SSP) 350. The Scheduler & Sequence Processor (SSP) 350 is responsible for sending all the cycle commands to the vector scalar processor (VSP) 371 and all the various individual matrix processor (MP) circuits within matrix processor array 397.

The Scheduler & Sequence Processor (SSP) 350 may include a Tree Walker (TW) 351 and a Row Sequencer (RS) 353. The Tree Walker (TW) 351 walks a neural network tree and is responsible for obtaining the data slices needed for processing. The Row Sequencer (RS) 353 may not just handle one row at a time, it can combine multiple rows into a single row sequence. The Row Sequencer (RS) 353 is responsible for implementing all the cycle commands for each data slice. Every operating cycle, each vector scalar processor (VSP) 371 follows the received cycle commands from Scheduler & Sequence Processor (SSP) 350. The same is true for the matrix processors within the matrix processor array 397, the Accumulation Buffer 375, and the Direct Memory Access (DMA) unit 381. Every resource needs to be carefully sequenced for the Neural Processing Unit (NPU) 300 to operate properly. Thus, a set of cycle commands needs to be generated for each operating cycle.

A computer system designed for neural network processing may use many Neural Processing Units 300 within the same computer system to handle large neural networks. The different Neural Processing Units within a single computer system may be controlled in a manner to cooperate on the same neural network problem. (Alternatively, a single Neural Processing Unit may be partitioned into multiple areas and process completely different matrix computational problems simultaneously within the same Neural Processing Unit.) When several different Neural Processing Units are cooperating on the same computational problem, the DMA unit 381 may be used to transfer data from one Neural Processing Unit to another Neural Processing Unit via I/O interface 395, which provides external communication pathways for the NPU 300. This allows different Neural Processing Unit to address different stages or layers of the same neural network computational problem.

Packet Architecture for Neural Network Processing Introduction

As set for in the previous section, the operation of a Neural Processing Unit 300 is very complicated and thus it can be difficult to efficiently schedule work within a Neural Processing Unit 300. And since a neural network computer system may operate several Neural Processing Units simultaneously, the efficient scheduling of matrix processing operations within many different Neural Processing Units becomes even far more difficult.

To simplify the task of scheduling matrix processing operations, a packet architecture for neural network processing is proposed. The packet architecture system uses a packet compiler to analyze a neural network and break down the processing operations to be performed for neural network layers into individual units referred to as work packets. The individual work packets are self-contained units of processing work that may then be scheduled for execution as long as the source data required for the work packet is available. In this manner, the individual work packets can be efficiently scheduled for processing in a manner similar to network data packets including scheduling features such as prioritization and hardware utilization optimization.

The packet architecture system is a powerful platform for neural network processing optimization. In order to maximize flexibility, the proposed packet architecture system is not designed for any one specific class of neural networks. Instead, the packet architecture system has been designed to optimize the work processing for a broad class of neural networks. Thus, whether a particular neural network is for natural language processing, deep data analysis, machine translation, convolutional neural networks for digital image processing, or any other neural network application, the packet architecture system may be employed to improve the processing efficiency.

Packet Architecture for Neural Network Processing Overview

In order to fully describe the packet architecture for neural network processing, this section will present an overview of the proposed packet architecture system. Specifically, an overview will be presented with reference to FIGS. 4A to 4B that conceptually illustrate the process of going from a neural network representation to the execution of neural network work packets.

FIG. 4A illustrates a conceptual diagram of a multi-layer 4 convolutional neural network for processing digital images. The convolutional neural network of FIG. 4A processes a digital image though several neural network layers of convolutional operations, pooling operations, and other types of operations starting from an input image on the left and proceeding to a final result on the right.

Each of the neural network layers of FIG. 4A is converted into one or more neural network work packets that represent the processing work that must be performed to complete the processing for that neural network layer. Thus, when all of the individual neural network work packets are processed for a particular neural network layer, the processing work of that neural network layer will be completed.

FIG. 4B illustrates a few neural network work packets for two of the neural network layers in the neural network of FIG. 4A. Specifically, the first neural network layer that is a convolution layer has been broken down into four convolution work packets labeled Conv1 to Conv4. All of the different convolutional neural network layers of FIG. 4A are broken down into sets of work packets (not shown). A MaxPool layer has been broken down into three MaxPool work packets labeled MaxPool1, MaxPool2, and MaxPool3.

After breaking the neural network layers into work packets, all of the created work packets are then organized into a packet stream order for packet processing as illustrated by FIG. 4C. The main requirement on the work packet stream ordering is that the packets must be ordered in a manner that respect data dependencies. Specifically, a first work packet that creates intermediate output data that is needed as input data for second work packet must be placed before that second work packet in the packet stream.

Although respecting the data dependencies places one requirement on the work packet stream ordering, there are still many different ways to order the neural network work packets. In order to best optimize the execution of work packets, the work packets are organized into a packet stream order according to one or more constraint metrics. For example, the work packets may be ordered in a manner to maximize the throughput of the execution engines. Or the work packets may be ordered in manner to minimize the latency of the execution. Hardware constraints may also come into play such that the packet compiler may order the work packets in a manner to minimize memory bandwidth usage or memory usage. In a mobile environment, the work packet ordering may be done in a manner to minimize energy consumption and thus maximize the operating time for a given battery charge.

Finally, after creating an ordered work packet stream, the ordered work packet stream is provided to a Neural Processing Unit (NPU) as illustrated in FIG. 4D. The work packet stream is processed by hardware sequencers that assign work packets to processing engines that natively execute the work packets. A resource manager ensures that various resources (such as memory storage, memory bandwidth, etc.) are allocated as required.

Neural Network Work Packet Definition

Figure 5A:
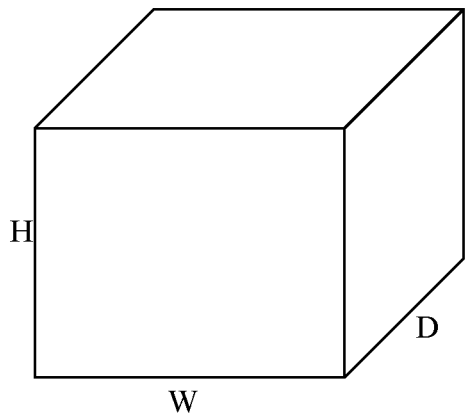
FIG. 5A illustrates a three-dimensional data tensor for a neural network layer.

As illustrated in FIGS. 1A and 1B, a neural network receives input data that is then processed through a series of neural network layers to create output data for that neural network. In the simple examples of FIGS. 1A and 1B, the neural network layers use a one-dimensional data vector (input data 101 to 104). But in practice, the input data and output data for neural network layers often comprises multidimensional data tensors. FIG. 5A conceptually illustrates a three-dimensional data tensor that may be used for neural network layer input data or output data, but any number of dimensions may be used in data tensors.

The three-dimensional data tensor of FIG. 5A comprises a three-dimensional data array of height H, width W, and depth D. In matrix notation form, the three-dimensional data tensor for a neural network layer may be referred to as [0-H][0-W][0-D]. For the proposed packet architecture, a neural network layer work packet is defined with the output data that will be created from the work packet. Thus, if a single work packet is to process all of the output data for a neural network layer with a single work packet, then that single full layer work packet output data would conceptually be illustrated as in FIG. 5A.

However, it is often impractical to process an entire neural network layer with a single work packet due to neural processor unit constraints, memory bandwidth constraints, and memory storage constraints of the neural processing unit. Furthermore, attempting to process an entire neural network layer with a single work packet may not take advantage of the data parallelism inherent in neural network processing. Thus, the proposed packet architecture will generally break up neural network layers into multiple work packets. Each neural network layer work packet represents the work for s a contiguous fragment of neural network layer output data. All of the work packets with contiguous fragments of neural network layer output data thus combine to represent the entire neural network layer work (as illustrated earlier in FIG. 4B).

Figure 5B:
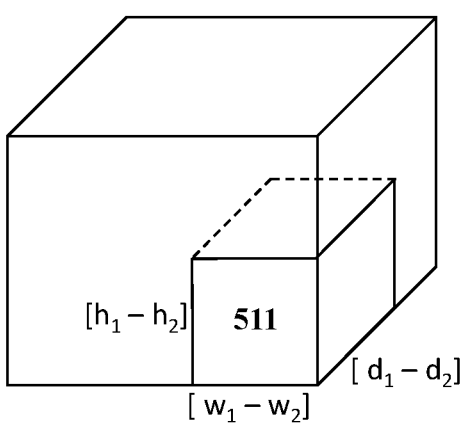
FIG. 5B illustrates a contiguous fragment of output data for a work packet within a three-dimensional data tensor for a neural network layer.

FIG. 5B conceptually illustrates a contiguous fragment of neural network layer output data 511 for a neural network work packet. Specifically, FIG. 5B illustrates the corresponding neural network work packet 511 for contiguous fragment output data defined by the range [h1-h2][w1-w2][d1-d2] within the entire output data for the neural network layer defined by [0-H][0-W][0-D].

Figures 5C, 5D:
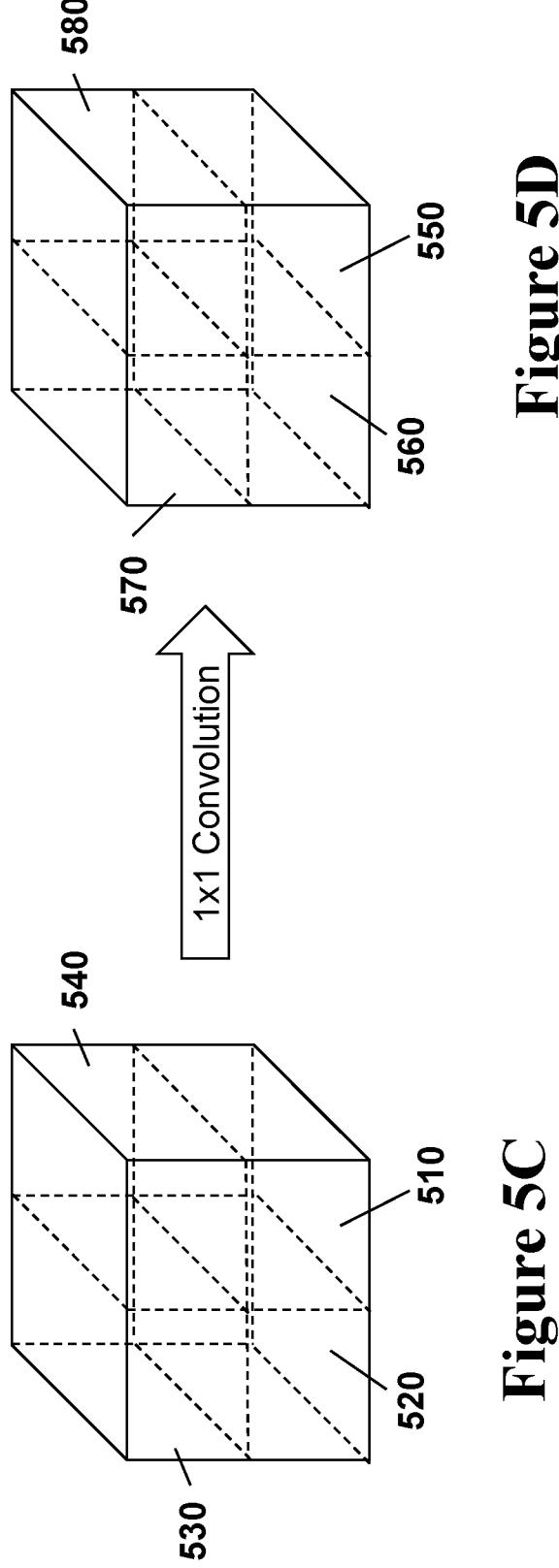
FIG. 5C illustrates four contiguous fragments of output data from a work packet that may be used as input data for a subsequent network layer.
FIG. 5D illustrates four contiguous fragments of output data created from a 1×1 convolution of the input data from FIG. 5C.

With the proposed packet architecture, neural network layer computations may be divided into multiple smaller work packets such that the processing of the various work packets may be processed in parallel. For example, FIG. 5C illustrates a three-dimensional data tensor for a neural network layer that has been divided into four neural network work packets 510, 520, 530, and 540. The output tensor data of FIG. 5C can be used as input data for subsequent 1×1 convolutional operations for the work packets 550, 560, 570, and 580 illustrated in FIG. 5D, respectively.

Figures 5E, 5F:
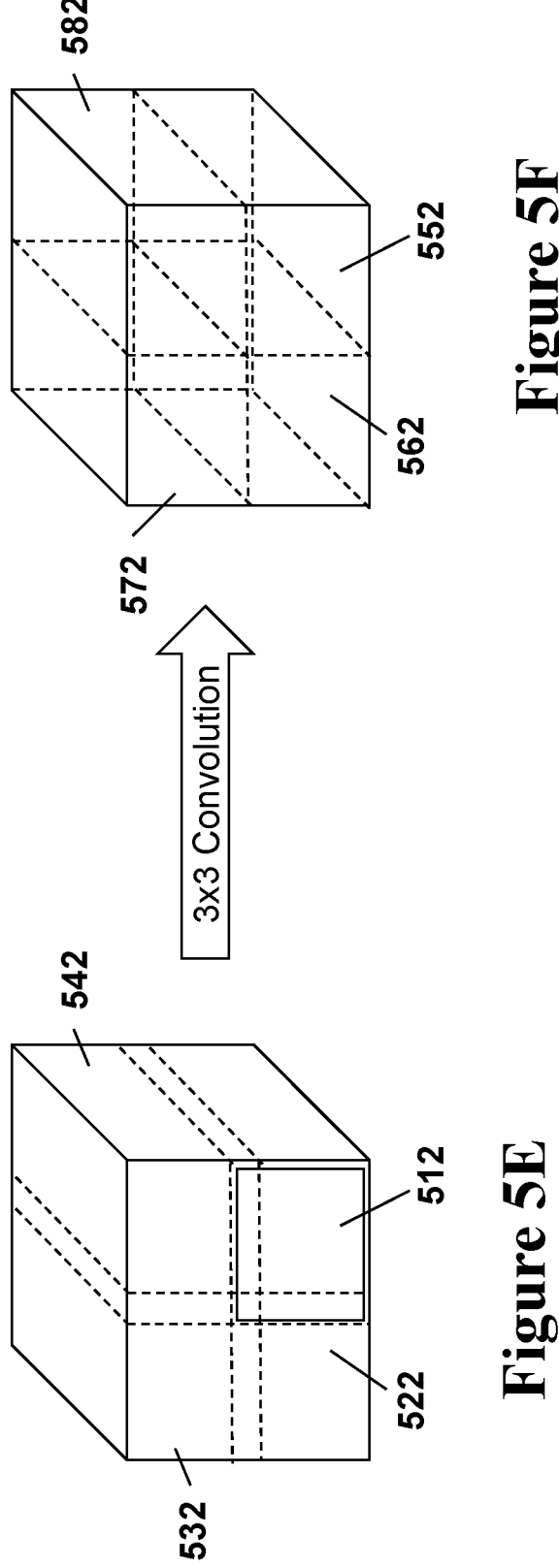
FIG. 5E illustrates four overlapping sections of tensor data that may be used as input data for a subsequent network layer.
FIG. 5F illustrates four contiguous fragments of output data created from a 3×3 convolution of the input data from FIG. 5E.

Note that there will not always be such a one-to-one correspondence between an input data tensor and an output data tensor. For example, if the example of FIGS. 5A and 5B were a 3×3 convolution instead of a 1×1 convolution, the input data tensors and output data tensors would be as illustrated in FIGS. 5E and 5F wherein the amount of data needed from the input data tensor 512 of FIG. 5E is larger than the output work packet data 552 of FIG. 5F. However, the output data work packets are always contiguous fragments that make up the entire neural network layer output data as illustrated in FIG. 5F.

In addition to the output data fragment, each neural network work packet comprises additional information needed to process the work packet within a neural processing unit. FIG. 6 conceptually illustrates one example of a basic neural network work packet 600.

Referring to FIG. 6, the work packet 600 includes work packet metadata 610 that describes the processing to be performed in order to create the output data fragment. Next, the example work packet 600 includes a reference to the input data 620 that will need to be processed to create the desired output data fragment. The work packet 600 also includes a reference to the weight matrix 630 associated with the neural network layer being processed. Finally, the neural network work packet 600 includes a reference to the contiguous output data fragment 650 that has been described earlier. Thus, the basic work packet 600 includes (or references) all the needed information to fully perform the processing of the work packet needed to generate the referenced contiguous output data fragment 650.

The work packet metadata 610 includes information describing the exact processing to be performed for the work packet. FIG. 7 illustrates a list of neural network layer types along with operands and attributes associated with the neural network layer types such that processing can be performed. The first row of FIG. 7 describes a two-dimensional convolution operation (Conv2D). The operand data may include a description of the input data such as Batch, Height, Width, Input Channels, etc. The operand data may also include a description of the weights such as the Output Channels, Kernel Height, Kernel Width, Input Channels, etc. Attributes for the two-dimensional convolution operation may include Padding, Stride, Groups, Dilation, Depth Multiplier, Quantization Info, etc.

The second row of the work packet metadata 700 describes a two-dimensional Maximum Pooling operation (MaxPool2D). The operands for the Maximum Pooling operation may include description of the input data such as the Batch, Height, Width, Channels, etc. Thus, the first two rows of FIG. 7 described the work packet metadata for the work packets illustrated in FIG. 4B.

Three more neural network layer types are illustrated in the example work packet metadata 700. Specifically, an Add operation, a two-dimensional resize operation, and a Recurrent Neural Network (RNN) Cell operation are presented. However, the metadata examples of FIG. 7 are just a small sample of many different types of neural network layer operations that may be specified in a work packet.

In addition to just the layer type information, the work packet metadata 610 may include other information to aid in the execution of the work packet. For example, the metadata may include a priority level of the work packet.

Neural Network Work Packet Creation

Referring back to FIGS. 4A to 4D, a very important phase in the neural network work packet architecture is the creation of work packets illustrated in FIG. 4B. This section will describe the creation of neural network work packets with reference to FIGS. 8, 9A, 9B, and 9C.

Figure 8:
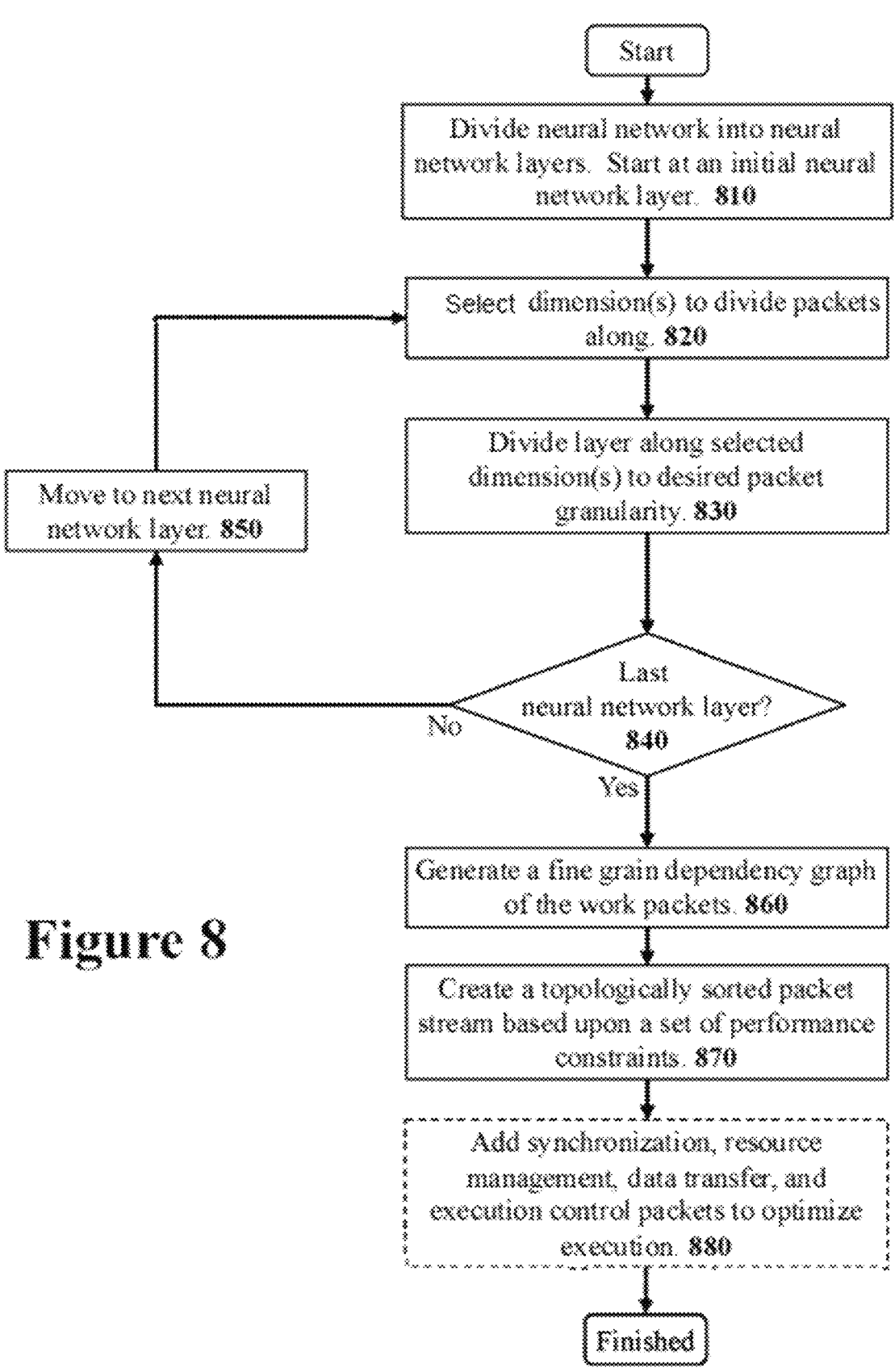
FIG. 8 illustrates a flow diagram describing the creation and ordering of neural network work packets.

Referring to FIG. 8, the first step 810 is to divide the neural network into individual neural network layers. This step is generally performed by neural network creation tools such as ONNX, TVM, TFLite, MLIR, etc. that are used to create neural networks. An abstracted set of four neural network layers (910 to 940) is illustrated in the neural network conceptual diagram FIG. 9A.

A packet architecture compiler then begins processing the neural network by starting a first neural network layer at step 810. Next, at step 820, the packet compiler selects at least one dimension of the output tensor data to divide output tensor data along. In the example output tensor data of FIG. 5D, the output data tensor is divided along the height and width dimensions.

Referring back to FIG. 8, the packet architecture compiler then divides the neural network layer along the selected dimension(s) at step 830 until the desired work packet granularity is achieved. The work packet granularity may be selected based upon memory availability and the neural processing unit hardware limitations.

The division of a neural network output tensor into individual work packets may be performed in a variety of different manners. In a first manner, the output data tensor for the neural network layer may be divided iteratively along the one or more dimensions. For example, an output data tensor divided up on the width dimension can be divided up with a first work packet with a range of [0-H][0-Δw][0-D], a second packet with a range of [0-H][Δw-2Δw][0-D], and so on until a final work packet with range [0-H][nΔw-W][0-D]. This type of iterative work packet division can also be done on multiple dimensions. For example, the work packet illustrated in FIG. 5B is divided along all three different dimensions of the neural network layer's output data tensor.

In an alternate system for dividing a neural network output tensor into work packets, the work packets may be created by recursively dividing the output tensor data of neural network layer until a desired packet size is reached. For example, in a first step a neural network layer output tensor may be divided into [0-H][0-w/2][0-D] and [0-H][w/2-0][0-D]. If that is small enough for the desired granularity then the packet compiler can stop there. If that is not small enough then the packet compiler may be further divided into [0-H][0-w/4][0-D], [0-H][w/4-w/2][0-D], [0-H][w/2-w3/4][0-D], and [0-H][w3/4-W][0-D]. Again, this recursive type of division of a neural network output data tensor may be performed on multiple dimensions as well. Or the packet compiler may alternate between different dimensions. Many different techniques may be used to achieve the desired granularity as long as the final set of work packets for a neural network layer fully cover the output tensor data with a set of contiguous work packets.

Figure 9A:
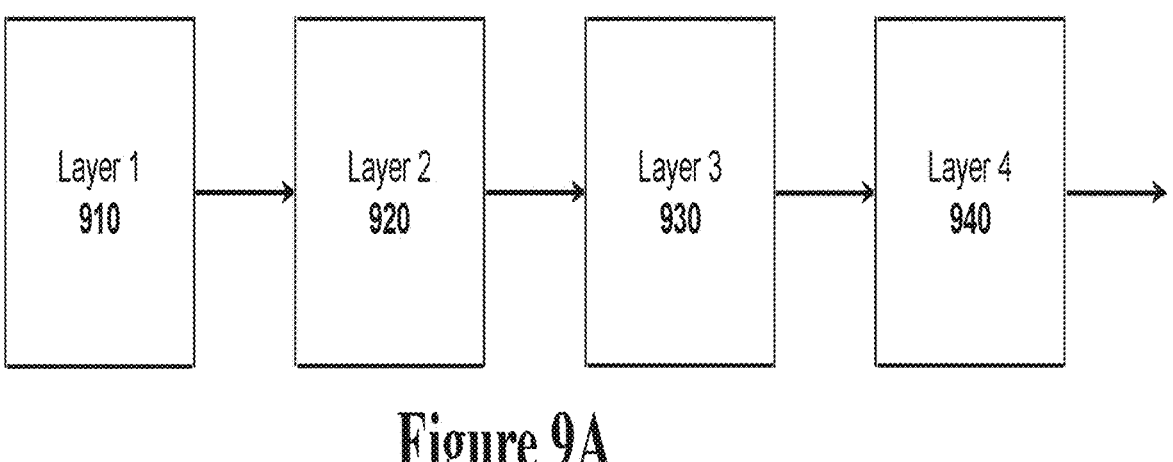
FIG. 9A conceptually illustrates the layers of a multi-layer neural network.
Figure 9B:
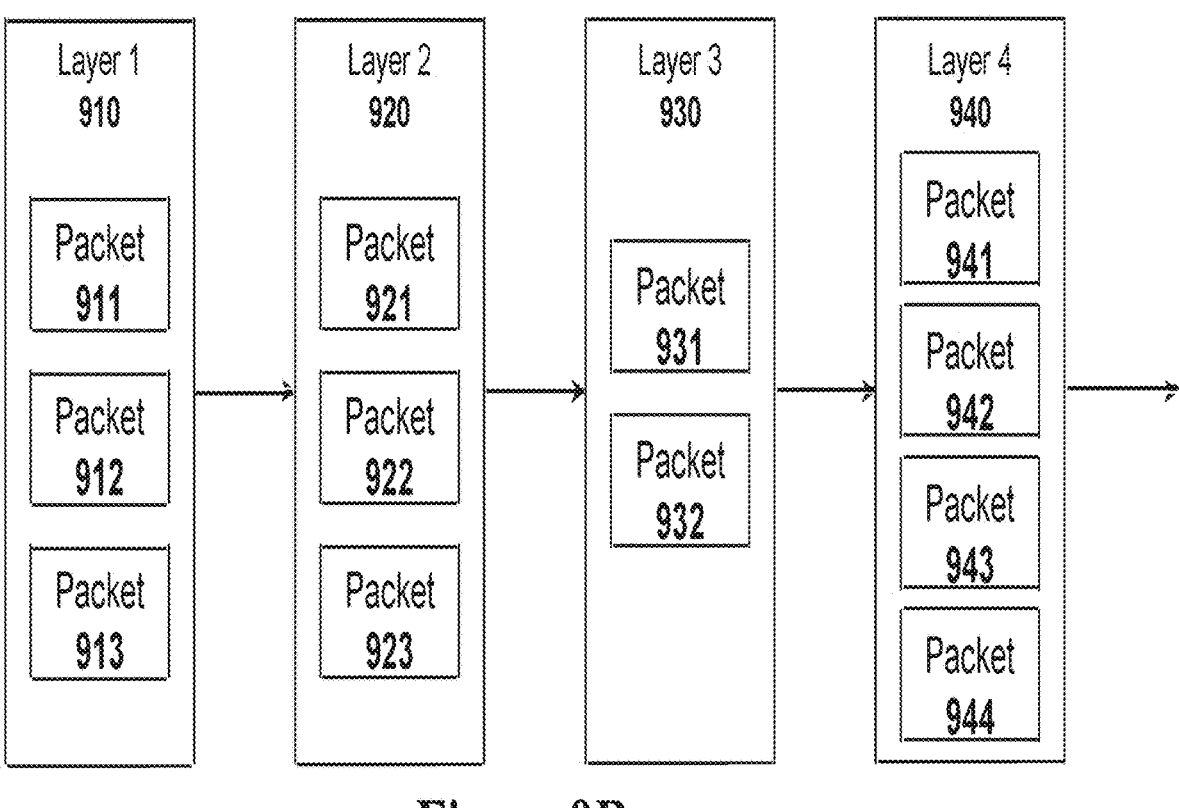
FIG. 9B illustrates work packets created for the layers of the multi-layer neural network of FIG. 9A.

Referring to FIG. 9B, neural network layer 1 910 is illustrated as being divided into three work packets (911, 912, 913). Referring back to FIG. 8, the packet compiler then determines if this is the final neural network layer to be compiled into work packets at step 840. If it is not the final neural network layer, then the packet compiler proceeds to the next neural network layer at step 850 and then repeats steps 820, 830, and 840 for that next neural network layer.

After proceeding through all the neural network layers, a full set of work packets (e.g., 911 to 913, 921 to 923, 931 and 932, and 941 to 944) will be created for all the neural network layers (e.g., 910 to 940). FIG. 9B conceptually illustrates a full set of work packets for the neural network of FIG. 9A. Note that different numbers of work packets may be generated for each neural network layer since the divisions will be based upon the specific information associated with each neural network layer.

Neural Network Work Packet Stream Ordering

The work packets of FIG. 9B represent all of the processing work that must be done to process the neural network of FIG. 9A. However, these work packets are not yet ready for execution by a neural processing unit. Specifically, the work packets must first be organized into a properly ordered packet steam.

Figure 9C:
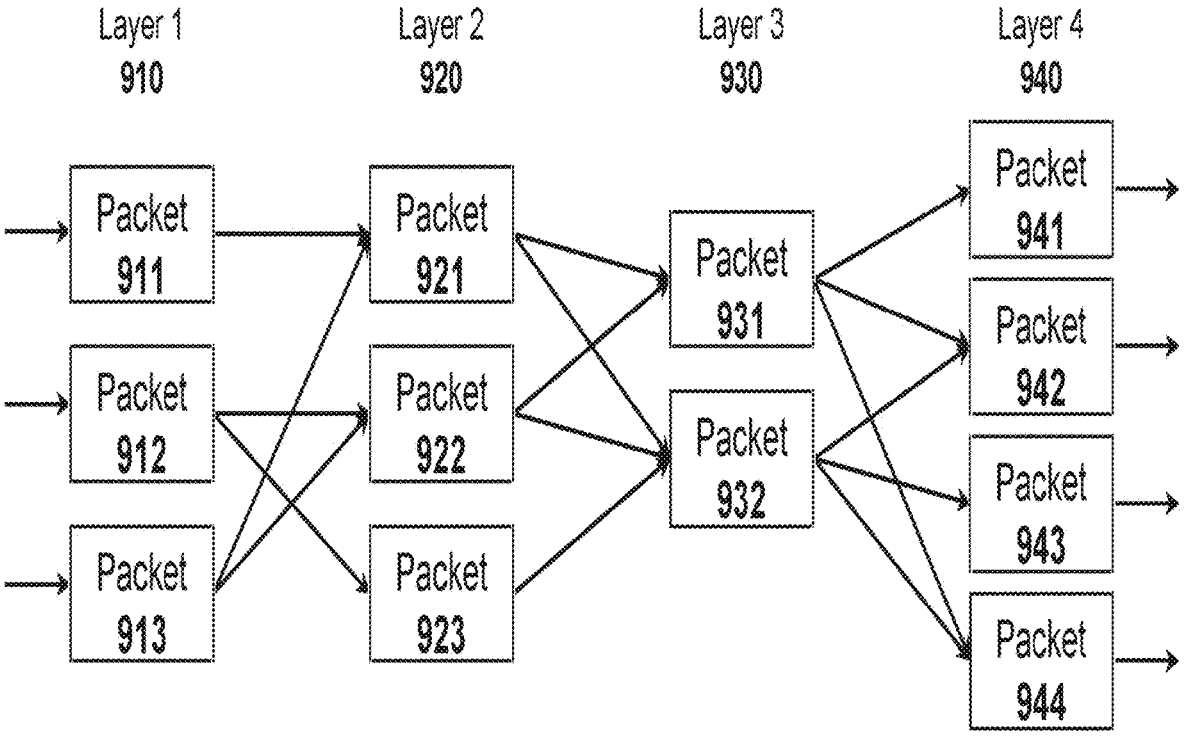
FIG. 9C illustrates a directed acyclic graph representing the data dependencies of the work packets of FIG. 9B.

Referring back to FIG. 8, after packet creation, the packet compiler proceeds to step 860 wherein the packet compiler generates a fine grain data dependency graph for all of the work packets created. The data dependency graph specifically describes which work packets are dependent on data from other work packets so that the work packets can be placed into a proper packet stream order. Specifically, the packet stream order will ensure that the needed input tensor data will be available before a work packet is dispatched to an execution engine of a neural processing unit. FIG. 9C conceptually illustrates a Directed Acyclic Graph (DAG) that illustrates the fine grain data dependency graph for the work packets (e.g., 911 to 913, 921 to 923, 931 and 932, and 941 to 944) of FIG. 9B.

The Directed Acyclic Graph (DAG) of FIG. 9C represents some packet ordering constraints that must be followed (namely the data dependency constraints) but there are still many different possible data packet streams that respect the data dependency constraints of FIG. 9C. Thus, referring back to FIG. 8, the packet compiler next creates a topologically sorted packet stream based upon set of performance constraint metrics at step 870.

Many different performance constraints may be considered depending on the particular application or environment of the neural network. A first type of constraint that may be considered is end-to-end latency of the neural network processing that attempts to minimize the amount of time to process the neural network. An end-to-end latency optimization will tend to create the packet stream ordering that will maximize the resource utilization of neural processing units available.

Another type of constraint that may be considered is initial latency wherein the system optimizes the packet stream in a manner that provides an initial set of results as soon as possible. This type of optimization may be desired in situations wherein a user wants to see some type of output as fast possible even though the entire set of results will not be completed as fast as possible.

Another type of constraint that may be optimized on is the memory bandwidth utilization maximization. If there are several different neural networks being processed concurrently, the different neural network processing streams may cause memory bandwidth issues as the different processing streams compete for resources. Thus, ordering packets in a manner that minimizes memory bandwidth utilization may optimize processing in such situation. A similar type of optimization may be performed on based on-chip memory resource optimization since a shortage of memory on the neural processing unit may cause frequent accesses to off-chip memory that slow the processing.

In a mobile environment, the packet stream ordering may be done with a power usage minimization to reduce the amount of energy consumed by the neural network processing. In this manner, the packet compiler may extend the battery life of the mobile device performing the neural network processing.

The packet ordering optimization of step 870 may be implemented in several different manners. In one embodiment, the packet compiler uses objective-based heuristics to generate the packet stream ordering.

In another embodiment, the packet compiler may use feedback-driven tuning to select a work packet ordering. Specifically, the packet compiler makes a first attempt at packet ordering using some heuristic and then analyzes the results of that first attempt. Using the feedback from that analysis, the packet compiler then revises the packet order in attempts to improve the packet ordering. The packet compiler may go through several iterations of packet ordering, analysis, and then tuning until a desired outcome is achieved.

In yet another embodiment, the packet compiler may use estimation-driven scheduling. In such an embodiment, each work packet is individually analyzed such that estimates about the work packet performance are created. The estimates for each work packet are then used to provide hints as to how to best order the packet stream according to the desired optimization constraint.

At the end of step 870 of FIG. 8, the packet compiler outputs an ordered packet stream that can then be executed. Thus, referring back to FIG. 4D, the work packet stream may be sent to a neural processing unit for work packet execution.

Neural Network Work Packet Stream with Control Packets

The work packet stream created at the end of step 870 provides an excellent stream of work packets that can improve execution performance in a dedicated neural processing unit. However, the packet architecture system can be even further improved to provide even better performance. Specifically, a set of control packets can be intermixed with the work packet stream wherein the control packets provide additional information to the neural processing unit to more efficiently execute the work packets. In general, the work packets that specify processing work to be performed will make up most packets in a packet stream, the control packets will interject additional information that improves the execution.

Referring back to FIG. 8, step 880 has been added in order to add control packets. Specifically, at step 880, the packet compiler may add synchronization, resource management, data transfer, execution control, and other types of control packets to further optimization run-time execution. The packet compiler is informed about the specific hardware parameters of the system that will execute the work packets. Using this execution environment information, the packet compiler adds control packets to the packet stream that will improve run-time execution. Note that the control packets may be separate packets from the work packets or integrated as part of the work packets.

To add control packets, the packet definition needs to be changed to incorporate the control packets. FIG. 10 illustrates one example of a full packet 1000 description. In a first field, the full packet 1000 includes an identifier that identifies the neural network layer (for work packets) and operation that will be performed. The operation may be a work operation for work packets or a control operation for control packets. The next field describes layer specific metadata information for the packet as set forth with reference to FIG. 7.

A third field describes resource management information that is associated with control packets that specify resource management operations. A fourth field specifies synchronization information that is used to synchronize the execution of different packet streams.

A fifth field contains scheduling information that helps the run-time execution system optimize the scheduling of packets. Specifically, priority information may be used to prioritize some packets over other packets. Information in the scheduling field may also be used to select the engine to execute a packet.

A sixth field contains debugging statistics. The debugging statistics field allows for code instrumentation such that execution runs may be analyzed to help improve performance.

A final field in the example of FIG. 10 includes encapsulation and execution control information. This field allows for execution control to be specified within packet stream. For example, loops and conditional execution structures may be created such that programming loops may be created within the packet stream.

Neural Network Work Packet Stream with Control Packets

Many different types of control packets may be created to optimize execution performance. A few examples of the metadata used to create different control packets is provided in this section.

FIG. 11 illustrates resource management packet metadata 1100 that includes metadata for resource management control packets. In the resource management metadata example of FIG. 11, two pairs of commands are present for controlling resources. A first pair of resource management control primitives is a reserve and release pair. These two primitives are used to reserve and release hardware resources for various packet stream jobs being processed. A second pair of primitives is an allocate and deallocate pair that allows resources to be dynamically allocated and deallocated during execution.

FIG. 12 illustrates synchronization packet metadata 1200 for a synchronization control packet. The synchronization system may operate using a set of counters to synchronize execution of packet streams. A first type of operation is a clear operation that clears a counter based on an event. A second type of operation increments a counter based on an event. And a third synchronization operation instructs the system to stall a particular packet stream until a counter value becomes equal or greater than a particular value.

FIG. 13 illustrates data transfer packet metadata 1300 for a data transfer control packet. Since the packet compiler understands the specific run-time hardware environment that will be used, the packet compiler can interject data transfer operations to move data around as needed to optimize runtime performance. Thus, the data transfer control packet describes the source, destination, and other operands needed to transfer data.

FIGS. 14A to 14C illustrate a very powerful type of packet information that can allow the packet compiler to have great control over the packet execution. Specifically, FIGS. 14A to 14C illustrate packet encapsulation wherein packets can encapsulate other packets.

FIG. 14A illustrates a first example of packet encapsulation wherein a synchronization packet encapsulates control packets and work packets. Specifically, the synchronization packet waits for a specific event to occur and then executes the encapsulated packets that include a first data transfer control packet, a work packet, and a second data transfer control packet.

FIG. 14B illustrates an execution control loop packet. Specifically, the control loop packet can continually execute an encapsulated work packet until specified event occurs that breaks the loop. Using reference pointers, the encapsulated packet may be executed on different data in each loop iteration. Alternatively, the packet compiler can update the way work packet is generated and embed the rules of update as part of encapsulation itself.

Finally, FIG. 14C illustrates an encapsulation condition packet for execution control. The condition packet determines a particular outcome and then executes a first work packet if the condition is true and second work packet if the condition is false.

Neural Network Packet Execution

Figure 15:
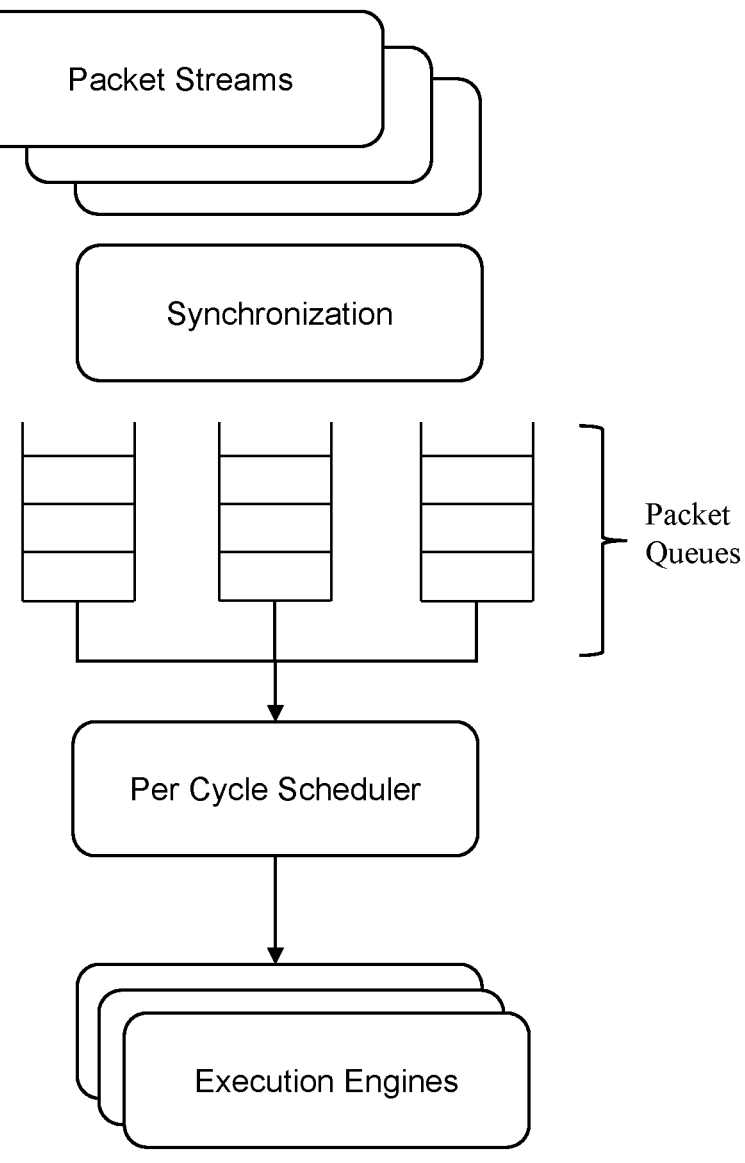
FIG. 15 is a high-level diagram describing how work packet may be executed in a neural processing unit.

FIG. 15 illustrates a high-level conceptual diagram describing how packet stream execution may be performed. At the top of FIG. 15 is a set of ordered packet streams ready for execution. A synchronization system processes the synchronization control packets to keep packet streams synchronized.

Packets from the different packet streams are placed into different packet queues for processing. The different packet queues may represent workload from different processing jobs or work for the same job but from different parts of the same neural network. The packets may be separated into opportunistic queue vs high priority queue through compiler optimizations.

A Per-Cycle Scheduler remove packets from the packet queues and feeds the packets to the execution engines of the neural processing unit. The executions engines decode the packets and perform the described processing.

The preceding technical disclosure is intended to be illustrative and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of processing a multi-layer neural network, the method comprising the steps of:

dividing, with a packet compiler, each neural network layer of a set of neural network layers into a set of individual work packets for the neural network layer, each of the neural network layers comprising a set of input data elements and a set of output data elements, each individual work packet comprising (a) a subset of the set of output data elements for the neural network layer, (b) an associated weight matrix reference identifying weights specific to the subset of the set of output data elements, and (c) metadata comprising at least scheduling information for the individual work packet, the set of individual work packets for the neural network layer collectively covering all of the set of output data elements for the neural network layer;

generating, with the packet compiler, a dependency graph identifying data dependencies between the individual work packets of different neural network layers and creating an optimized packet stream order based on the data dependencies, the optimized packet stream order minimizing sequential processing of dependent work packets; and processing, with a neural processing unit having multiple matrix processors, the individual work packets from the optimized packet stream order as processing tasks in parallel while maintaining the data dependencies identified in the dependency graph.

2. The method of claim 1, wherein the metadata for the individual work packet comprises a specification for a convolution operation.

3. The method of claim 1, wherein the output data elements are multidimensional tensors.

4. The method of claim 1, wherein the processing occurs on multiple neural processing units.

5. The method of claim 4, wherein the processing of each of the individual work packets comprises processing each of the individual work packets as native execution on a neural processing unit.

6. The method of claim 1, wherein each individual work packet comprises a priority value to schedule the individual work packet.

7. The method of claim 1, wherein the metadata for the individual work packet comprises metadata for synchronizing individual work packet execution.

8. The method of claim 1, wherein the metadata for each individual work packet comprises resource metadata for allocating hardware resources associated with a neural processing unit.

9. The method of claim 1, wherein the metadata for the individual work packet comprises data movement metadata for efficiently moving data.

10. The method of claim 1, wherein each individual work packet comprises an encapsulation of one or more of the individual work packets.

11. An apparatus for processing a multi-layer neural network having a set of neural network layers, each of the neural network layers comprising a set of input data elements and a set of output data elements, the apparatus comprising:

a packet compiler configured to divide each of the neural network layers into a set of individual work packets for the neural network layer, each individual work packet comprising (a) a subset of the set of output data elements for the neural network layer, (b) an associated weight matrix reference identifying weights specific to the subset of the set of output data elements, and (c) metadata comprising at least scheduling information for the individual work packet, the set of individual work packets for the neural network layer collectively covering all of the set of output data elements for the neural network layer, the packet compiler further configured to generate a dependency graph identifying data dependencies between the individual work packets of different neural network layers and create an optimized packet stream order based on the data dependencies, the optimized packet stream order minimizing sequential processing of dependent work packets; and a neural processing unit having multiple matrix processors, the neural processing unit configured to process the individual work packets from the optimized packet stream order as processing tasks in parallel while maintaining the data dependencies identified in the dependency graph.

12. The apparatus of claim 11, wherein the metadata for the individual work packet comprises a specification for a convolution operation.

13. The apparatus of claim 11, wherein the output data elements are multidimensional tensors.

14. The apparatus of claim 11, wherein the apparatus comprises multiple neural processing units.

15. The apparatus of claim 14, wherein each of the multiple matrix processors is configured to execute each individual work packet as a native instruction operation.

16. The apparatus of claim 11, wherein each individual work packet comprises a priority value to schedule the individual work packet.

17. The apparatus of claim 11, wherein the metadata for the individual work packet comprises metadata for synchronizing individual work packet execution.

18. The apparatus of claim 14, wherein the metadata for each individual work packet comprises resource metadata for allocating hardware resources associated with a neural processing unit.

19. The apparatus of claim 11, wherein the metadata for the individual work packet comprises data movement metadata for efficiently moving data.

20. The apparatus of claim 11, wherein each individual work packet comprises an encapsulation of one or more of the individual work packets.

* * * * *